(12) United States Patent
Hao et al.

(10) Patent No.: US 12,470,285 B2
(45) Date of Patent: Nov. 11, 2025

(54) METHOD AND DEVICE FOR IMPROVING PIPELINE SAFETY FOR SPACE-TERRESTRIAL NETWORK ARCHITECTURE

(71) Applicant: ZHEJIANG LAB, Hangzhou (CN)

(72) Inventors: Nan Hao, Hangzhou (CN); Xingming Zhang, Hangzhou (CN); Xiangming Zhu, Hangzhou (CN); Fujun Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 19/002,805

(22) Filed: Dec. 27, 2024

(65) Prior Publication Data

US 2025/0132810 A1    Apr. 24, 2025

Related U.S. Application Data

(63) Continuation of application No. PCT/CN2023/101762, filed on Jun. 21, 2023.

(51) Int. Cl.
*H04B 7/185* (2006.01)
*H04W 12/108* (2021.01)
*H04W 60/00* (2009.01)

(52) U.S. Cl.
CPC ........ *H04B 7/1851* (2013.01); *H04W 12/108* (2021.01); *H04W 60/00* (2013.01)

(58) Field of Classification Search
CPC ... H04B 7/1851; H04W 12/108; H04W 60/00
See application file for complete search history.

(56) References Cited

U.S. PATENT DOCUMENTS

| 9,635,195 B1* | 4/2017 | Green | H04N 1/00183 |
| 2003/0027524 A1* | 2/2003 | Matsuoka | H04B 7/18517 455/12.1 |

(Continued)

FOREIGN PATENT DOCUMENTS

| CN | 112367666 A | 2/2021 |
| CN | 115413014 A | 11/2022 |

(Continued)

OTHER PUBLICATIONS

International Search Report (PCT/CN2023/101762); Date of Mailing: Nov. 13, 2023(5 pages).

*Primary Examiner* — Dominic E Rego
(74) *Attorney, Agent, or Firm* — Wiersch Law Group (57) ABSTRACT

A method and a device for improving pipeline safety of a space-terrestrial network architecture. The method pre-registers the profile of a base station in the network repository function network element of a 5G core network; after receiving a relay pipeline connection establishment request initiated by a base station, a relay satellite sends a network function verification request to the network repository function network element through a network expose function network element; after receiving a response to a network function discovery request of the base station, the network expose function network element sets the corresponding verification result of the base station according to whether there is base station registration information and responds to a verification request of the network element; and finally, the relay satellite verifies the verification result cell carried in the received response to determine the legality of the current access to the base station.

10 Claims, 10 Drawing Sheets

(56) References Cited

U.S. PATENT DOCUMENTS

| | | | | |
|---|---|---|---|---|
| 2006/0122772 | A1* | 6/2006 | Lee | G01C 21/3691 |
| | | | | 701/439 |
| 2009/0299968 | A1* | 12/2009 | Green | G06F 16/48 |
| 2014/0370838 | A1* | 12/2014 | Kim | H04W 4/02 |
| | | | | 455/404.1 |
| 2015/0304731 | A1* | 10/2015 | Franke | H04N 7/20 |
| | | | | 725/71 |
| 2019/0230675 | A1* | 7/2019 | Papa | H04W 40/04 |
| 2019/0356482 | A1* | 11/2019 | Nix | H04W 12/041 |
| 2021/0352554 | A1* | 11/2021 | Barac | H04J 11/0056 |
| 2023/0074963 | A1* | 3/2023 | Saye | H04L 61/103 |
| 2023/0163984 | A1* | 5/2023 | Shan | H04M 15/66 |
| | | | | 370/259 |
| 2023/0180027 | A1* | 6/2023 | Xu | H04L 1/16 |
| | | | | 370/329 |
| 2023/0300596 | A1* | 9/2023 | Salmela | H04W 8/20 |
| | | | | 455/410 |
| 2024/0187176 | A1* | 6/2024 | Wang | H04W 72/23 |

FOREIGN PATENT DOCUMENTS

| | | | |
|---|---|---|---|
| CN | 115915138 | A | 4/2023 |
| CN | 116018825 | A | 4/2023 |
| CN | 116489652 | A | 7/2023 |
| WO | 2021224545 | A1 | 11/2021 |

\* cited by examiner

मेथड AND DEVICE FOR IMPROVING PIPELINE SAFETY FOR SPACE-TERRESTRIAL NETWORK ARCHITECTURE

METHOD AND DEVICE FOR IMPROVING PIPELINE SAFETY FOR SPACE-TERRESTRIAL NETWORK ARCHITECTURE

CROSS-REFERENCE TO RELATED APPLICATIONS

The present application is a continuation of International Application No. PCT/CN2023/101762, filed on Jun. 21, 2023, the content of which is incorporated herein by reference in its entirety.

TECHNICAL FIELD

The present disclosure relates to the technical field of computer network and communication, and in particular, to a method and a device for improving pipeline safety of a space-terrestrial network architecture.

BACKGROUND

At present, the 3GPP 5G technology only puts forward the discussion on the wireless side of the Integrated Satellite-Terrestrial Networks (NTN non-terrestrial networks), and there still lacks the research on the core network side. At the same time, Item 11.3 "Security Solution of Integrated Space-Terrestrial 5G Network" of CCSA TC12 Working Group's "Overall Technical Requirements for the Integrated Space-Terrestrial 5G Network" further gave a general description of the architecture and security requirements of the integrated space-terrestrial architecture as follows: the security of the integrated space-terrestrial 5G network should be comprehensively considered from the aspects of physical security, data security and network operation security, and the contents may include but are not limited to terminal connection security, space-based access network connection security, space-based core network connection security, terrestrial-based access network connection security, terrestrial-based core network connection security, network function security, user data security, network physical isolation and logical isolation, network management security, network configuration security, and integrated space-terrestrial service security. Available technical means include but are not limited to anti-destruction technology, anti-interference technology, secure access and secure routing technology, secure transmission, secure storage, key management technology and the like to build a security architecture for an integrated space-terrestrial network that can ensure the safe operation of the network system.

Figure 1:
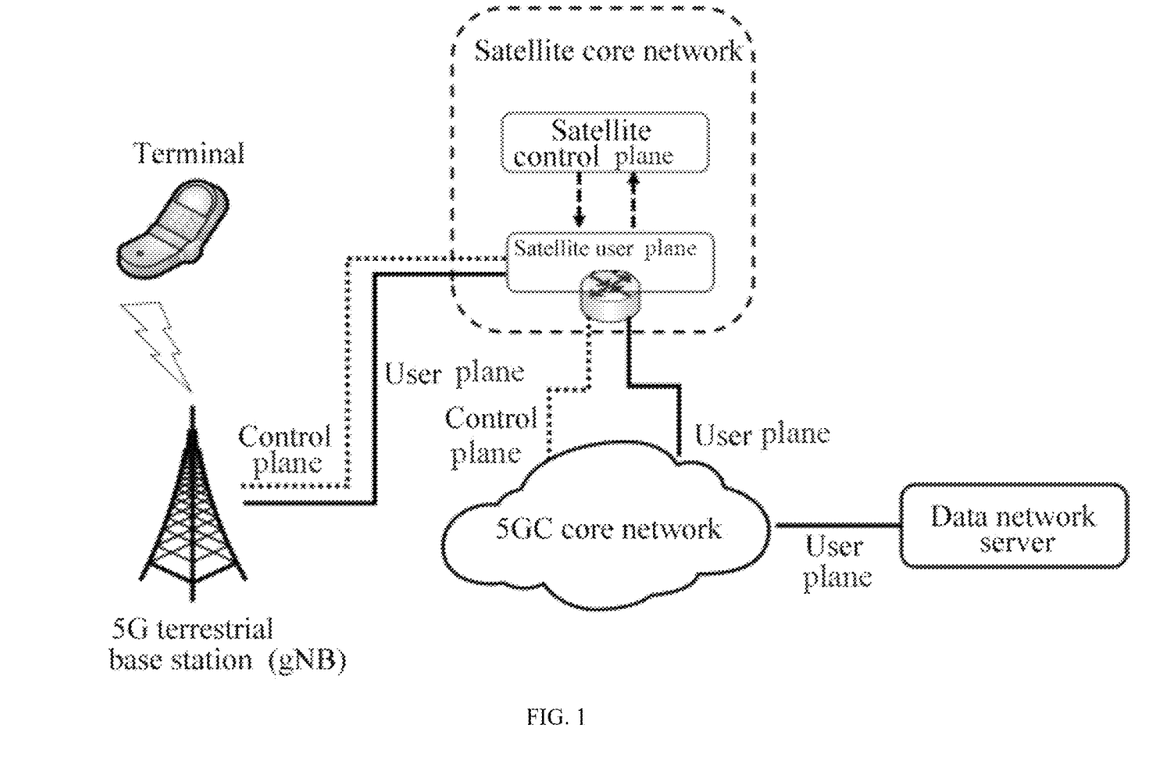
FIG. 1 is an architecture diagram of an integrated space-terrestrial 5G network system in the prior art.

As shown in FIG. 1, under the existing integrated satellite-terrestrial networking architecture, a 5G terminal is connected to a 5G terrestrial base station (gNB) through an air interface side. A backhaul network (including both control plane messages and user plane messages) from the 5G terrestrial base station to the 5G core network is relayed by the satellite, and the 5G terminal is finally connected to a data network server through a 5G data pipeline relayed by the satellite. It should be noted that the 5G system and the satellite system, which acts as a relay node in the 5G backhaul network, are completely independent and controlled by their respective core networks (a 5G core network and a satellite core network). Currently, there is no network function interworking or signaling interaction architecture and method between the two network systems. Whether the relay satellite controlled by the satellite core network can successfully establish a relay pipeline between the 5G terrestrial base station and the satellite depends on the pre-configured information of the 5G terrestrial base station in the satellite core network. The profile contains the network element node or instance information. At present, the profile of the 5G terrestrial base station can only be manually configured by the satellite core network, which is separate from the 5G system.

Figure 2:
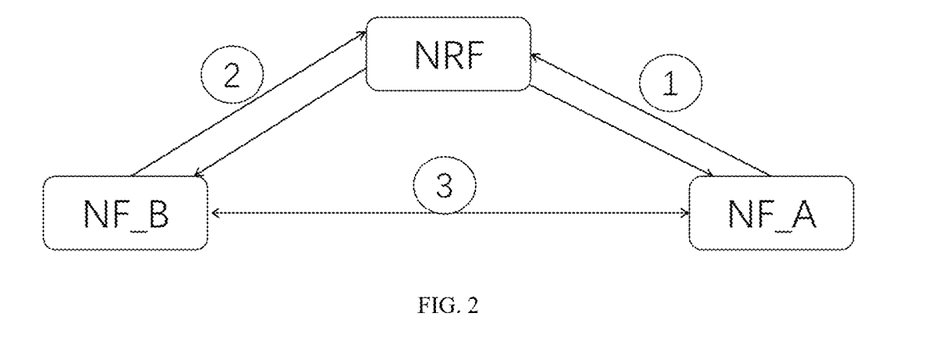
FIG. 2 is a flow chart of network element discovery of a 5G core network in the prior art.

Under the enhanced service-based architecture eSBA in the 5G core network, the search of the Network Function NF takes the form of registering the profile of the network function and the related discovery parameters in advance to the Network Repository Function NRF. When a certain network function needs to be used, the network function is a service producer, and the network element requesting the service is a service consumer. As shown in FIG. 2, when the service consumer (NF_B) has no available service provider (NF_A) information, NF_B carries the discovery parameters of NF_A and sends a search request to NRF, and NRF returns the content matching the query parameters according to the registration information of NF_A. The specific steps are as follows:

As shown in FIG. 2, the service provider NF_A registers the network function profile and the associated discovery parameters used for profile search to the NRF, and the NRF returns success to confirm the successful registration of NF_A. The NRF itself has the function of preventing the modification of registration information. Once a network element node is successfully registered, the NRF cannot modify the registration information to protect the information security of the network element node.

As shown in FIG. 2, when a service consumer NF_B needs to communicate with NF_A for functional interaction, the NF_B first sends the discovery parameters associated with NF_A to NRF and requests its associated NF_A pre-registered profile, which may contain information of one or more network element instance, and the NRF returns the registration information matching the query parameters.

As shown in FIG. 2, after receiving the query result returned by NRF, NF_B selects and connects one instance of NF_A according to a certain algorithm (such as round-robin) if there are multiple network function instances of NF_A.

Figure 3:
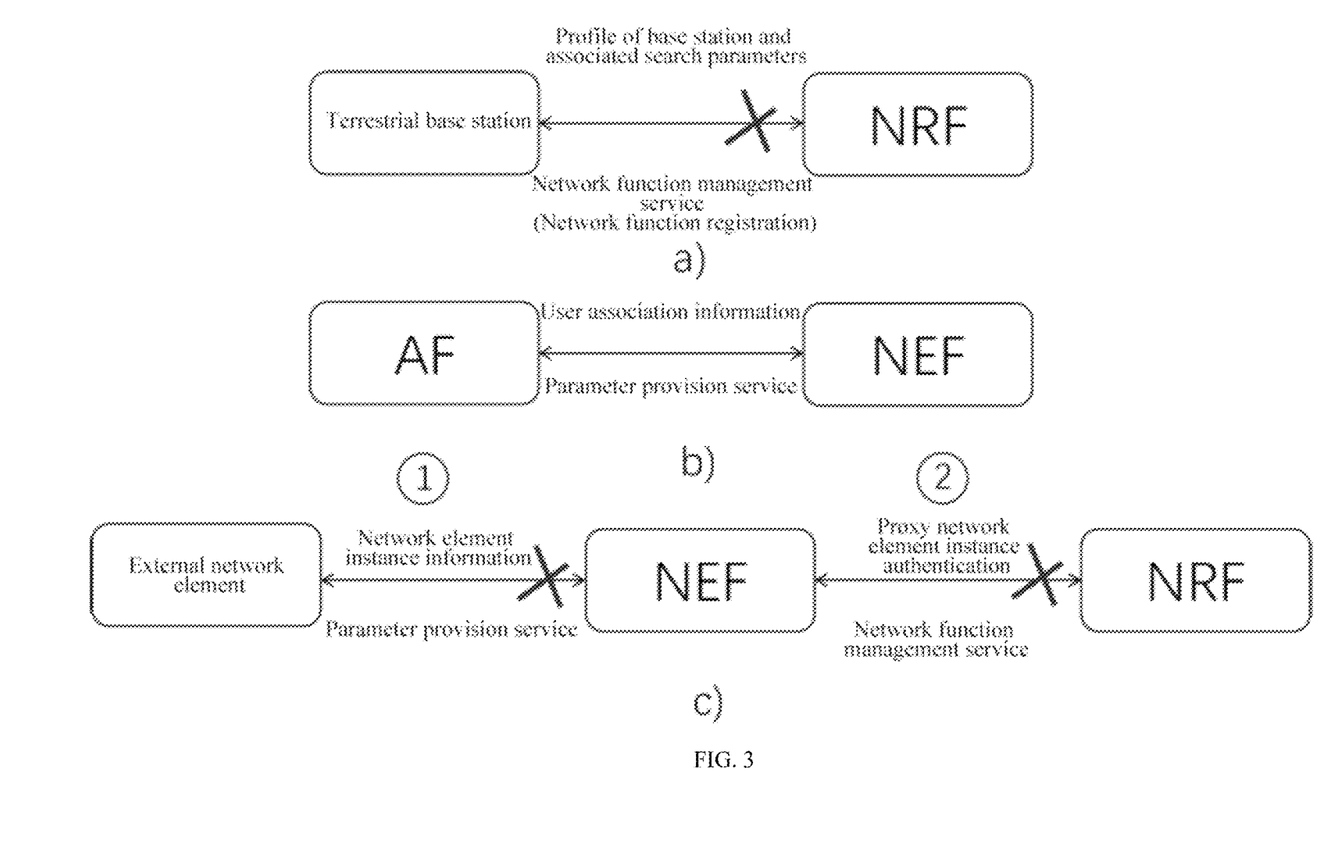
FIG. 3 is an overview of the NRF and NEF network functions of the 5G core network in the prior art.

As shown in a) of FIG. 3, at present, the 5G core network does not support the registration of a 5G base stations into the 5G core network NRF as a network function element for searching; as shown in (b) of FIG. 3, the existing 5G core network only supports the external disclosure function (AF Application Function) to provide the related service information of some UE (User Equipment) users through the Parameter Provision service of the NEF (Network Expose Function). At the same time, as shown in c) in FIG. 3, the external nodes of the 5G core network can only access the network elements of the 5G core network through the NEF (Network Expose Function), but the existing 5G core network does not support the external network elements to search/query the internal network elements registered in the NRF through the NEF, and there is no interface and signaling flow for inquiring the public information of the internal network elements.

Figure 4:
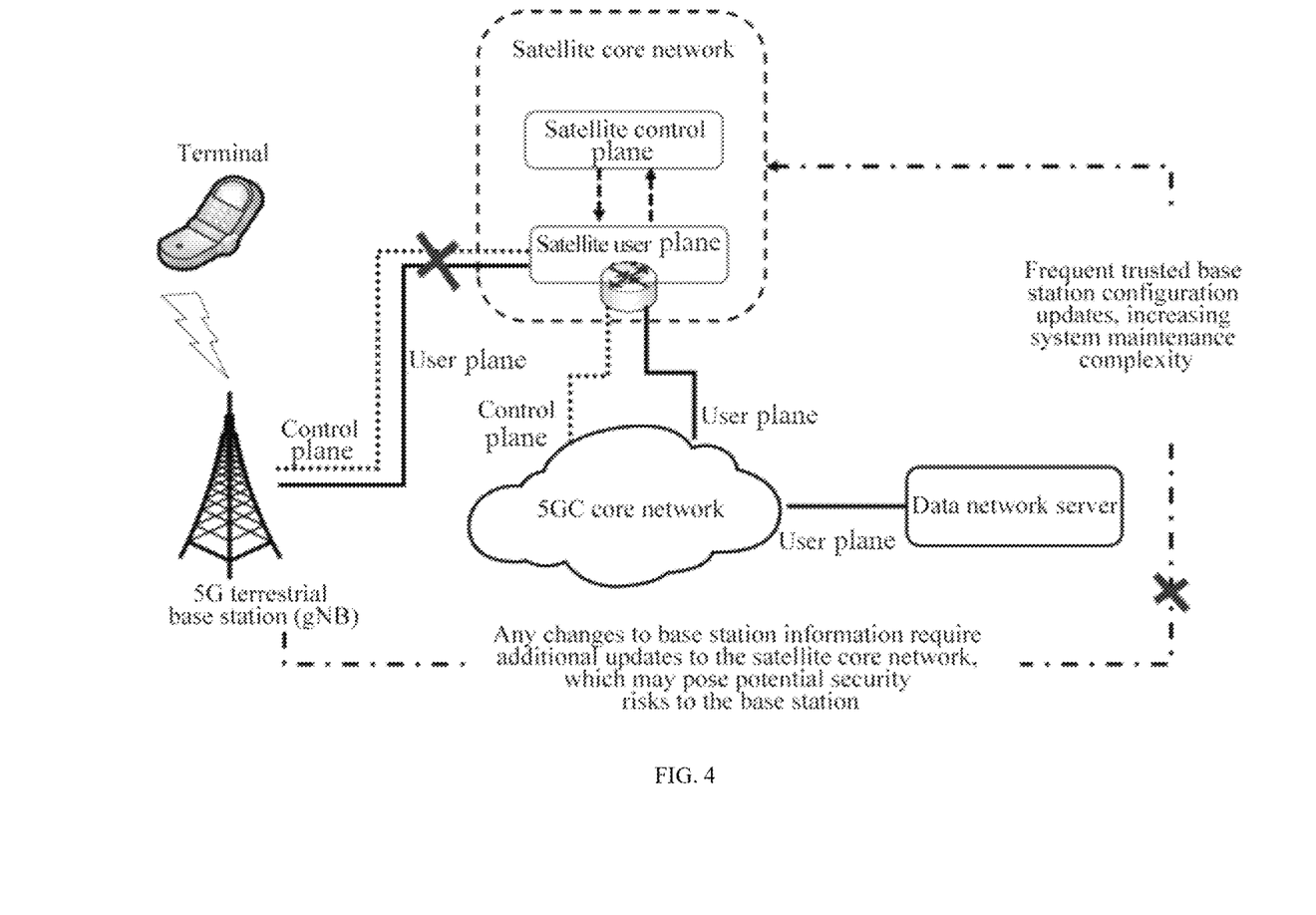
FIG. 4 is a schematic diagram of the connection of relay pipes of different systems in the integrated space-terrestrial architecture in the prior art.

As shown in FIG. 4, the existing satellite system that forms space-terrestrial integration networked with 5G has the following problems:

The satellite uses the pre-configuration method to discriminate the relay pipeline request of the 5G terrestrial base station, and any information change of the 5G terrestrial base station requires independent change of the profile of the satellite through the independent satellite system, which is cumbersome to operate and cannot be integrated into the network element management system based on the 5G service architecture eSBA. In the scenario of massive deployment of 5G base stations or small stations (including 5G base stations and 5G satellite gateways, or 5G system equipment with an access point function), the maintenance complexity of heterogeneous systems is further increased.

The information of the 5G terrestrial base station needs to be open to the satellite core network independent of the 5G system, and the profile is updated through the three-party pipeline, which further increases the information leakage of 5G system and leads to the security risk of the 5G system.

In the integrated satellite-terrestrial (heterogeneous) network architecture, due to the needs for the terrestrial station to establish a relay pipeline with the satellite and the core network, the satellite, serving as a heterogeneous system network element, only possesses the base station configuration table, which is unable to search the public information of the internal node of the 5G network through the 5G system. The satellite cannot use the existing 5G security system to discriminate the legality of the relay request connection of other base stations than the ones in the configuration table of terrestrial base stations. At the same time, because the satellite system does not have the legitimacy information of other base stations than the ones in the configuration table (which may be caused by improper or delayed configuration update operations), the satellite cannot establish the relay pipeline connection between the 5G terrestrial station and the 5G core network. As a result, user services cannot be guaranteed.

As mentioned above, in order to reduce the complexity of system maintenance, improve the security of data pipelines in heterogeneous systems and improve the user's business experience, there is an urgent need for a new data sharing architecture and network function reuse method for 5G and heterogeneous systems networked with 5G under the existing integrated space-terrestrial architecture.

SUMMARY

The object of the present disclosure is to solve the problems of data pipeline connection security, maintenance complexity and user service experience continuity between heterogeneous systems due to the inability to share public data and network functions between 5G and a heterogeneous network system networked with the 5G system on the existing 3GPP integrated space-terrestrial architecture (NTN) by providing an information sharing architecture and method based on 5G function sharing to improve the connection security between network elements/network devices of the integrated space-terrestrial heterogeneous system, the system maintenance operability and the user service experience.

The object of the present disclosure is achieved through the following technical solutions: a method for improving pipeline safety of a space-terrestrial network architecture. The method includes the following steps:
S1, when a legal base station is connected to a 5G core network or a network repository function network element updates a profile of a network function network element based on manual configuration, pre-registering the profile of the base station in the network repository function network element of the 5G core network.
S2, after receiving a relay pipeline connection establishment request initiated by the base station, initiating, by a relay satellite, a network element verification request carrying the profile of the base station to a network expose function network element based on the profile of the base station in the relay pipeline connection establishment request, and sending a network function search request to the network repository function network element through the network expose function network element.
S3, after receiving the network function search request, returning, by the network repository function network element, a base station query result to the network expose function network element according to a registration information; and when the registration information corresponding the base station exists, setting a verification result in a verification result cell as "REGISTERED" by the network expose function network element; and otherwise, setting the verification result as "NOT EXIST", and responding to the network element verification request of the relay satellite.
S4, responding and checking, by the relay satellite, the carried verification result cell according to the received network element verification request.

When the verification result cell carries the verification result of "REGISTERED", accepting the relay pipeline connection establishment request of the base station.

When the verification result cell carries the verification result of "NOT EXIST", rejecting the relay pipeline connection establishment request of the base station.

Further, a connection between the legal base station and the 5G core network in S1 is as follows:

Taking the legal base station and the 5G core network as network function nodes, and registering the profile of the base station to the network repository function network element of the 5G core network through a registration service of the network repository function network element of the 5G core network, wherein the profile of the base station in a registration process is carried through a newly added cell structure.

The profile of the base station comprises a mandatory parameter and optional parameters, and the mandatory parameter comprises a global base station node identity; and the optional parameters comprise a name of a base station node, a list of supported tracking areas and tracking area items supported in the list, as well as tracking area codes under the tracking area items.

Further, in S1, the step of pre-registering the profile of the base station in the network repository function network element of the 5G core network specifically includes:

Adding the profile of the base station into a network function profile carried in a registration request of the network repository function network element, and registering to the network repository function network element; when the registration is successful, returning a registration success status code and a corresponding network function profile, otherwise returning a registration failure status code or a relocation status code; and in a failure status, re-selecting an instance of the network repository function network element by the base station, and performing a base station registration process again for the selected instance of the network repository function network element.

Further, the network function search request sent by the network expose function network element carries query parameters of the profile of the base station, and the network repository function network element, after receiving the network function search request, continues to uses an existing network function discovery service to search the profile pre-registered for the base station.

Further, the query parameters of the profile of the base station are the mandatory parameter and the optional parameters consistent with the profile of the base station, and the mandatory parameter is used to determine the verification result; the optional parameters are used to provide subsidiary information of the base station.

Further, the step of after receiving the network function search request, returning a base station query result to the network expose function network element by the network repository function network element according to registration information specifically includes:

Checking whether the registration information matches the profile of the base station carried in the query request by the network repository function network element, and returning matching information and setting the request response status code as "query success".

When the network function search request cannot be processed, setting the request response status code as "invalid query" and retransmitting the network function search request, or setting the request response status code as "relocation" and carrying a resource relocation header in a response, which represents that the network function search request needs to be retransmitted and sent to a location specified by the resource relocation header.

Further, returning a response to the network function search request to a corresponding query relay satellite by the network expose function network element; when the response to the network function search request returned by the network repository function network element cannot be processed, setting a request response status code as "invalid request"; or setting the request response status code as "relocation" and carrying the resource relocation header to send to the relay satellite in the response.

Further, in S4, after receiving the response to the network function search request, when the request response status code is "query success", the relay satellite admits or rejects the base station initiating the relay pipeline connection establishment request according to the carried verification result; when the request response status code is "invalid query", the relay satellite needs to retransmit the network element verification request; when the request response status code is a relocation status code and the resource relocation header is carried in the response, the relay satellite needs to retransmit the network element verification request to the location specified by the resource relocation header; and when the relay satellite fails to obtain a valid verification result after trying the network element verification request for a preset number of times, the relay satellite rejects the relay pipeline connection establishment request of the base station.

In a second aspect, the present disclosure provides a device for improving pipeline safety of a space-terrestrial network architecture, including a memory and one or more processors. Executable codes are stored in the memory, and when the executable codes are executed by the one or more processors, the device is configured to implement the steps of the method for improving pipeline safety of a space-terrestrial network architecture.

In a third aspect, the present disclosure provides a computer-readable storage medium on which a program is stored. The program, when executed by a processor, is configured to implement the steps of the method for improving pipeline safety of a space-terrestrial network architecture.

The present disclosure has the beneficial effects that there is provided a method for reducing the complexity of system maintenance under a heterogeneous networking architecture, ensuring the safety of network relay pipelines in the heterogeneous systems and improving the service experience of users by sharing public data and reusing the existing network functions of 5G among heterogeneous systems under the integrated space-terrestrial 5G architecture. By registering the 5G terrestrial base station to the 5G core network NRF, the satellite system with 5G heterogeneous networking only needs to open the NEF interface based on the 5G function flow and the NEF-to-NRF network function registration information interface of the 5G core network, so as to determine the legitimacy of the terrestrial base station initiating the relay request. Since there is no need to open the information of the 5G base station to the external network elements of the 5G system, the safety of the 5G base station and the safety of the integrated space-terrestrial relay pipeline constructed by the 5G base station and the satellite system outside the 5G system are guaranteed.

In addition, compared with that traditional solutions of satellite and 5G networking at present, the present disclosure effectively reduce the operation complexity of profiles in the integrated 5G space-terrestrial system, significantly improves the bidirectional security of the base station and the satellite relay pipeline, and enhance the stability and reliability of the whole heterogeneous service system.

Finally, since the satellite system can verify the legitimacy information of the base stations not listed in the configuration table of the 5G system (which may be caused by improper or lagging operation of configuration update) through the 5G core network and establish a relay pipeline to connect with the 5G core network, the user service is guaranteed.

DESCRIPTION OF EMBODIMENTS

In order to make the above objects, features and advantages of the present disclosure more obvious and easy to understand, the specific embodiments of the present disclosure will be described in detail with reference to the accompanying drawings.

It should further be noted that the terms "including", "comprising" or any other variations thereof are intended to cover non-exclusive inclusion, so that a process, method, commodity or equipment including a series of elements includes not only those elements, but further other elements not explicitly listed, or elements inherent to such process, method, commodity or equipment. Without more restrictions, an element defined by the phrase "including a (an)" does not exclude the existence of other identical elements in the process, method, commodity or equipment including the element.

Specific embodiments of this specification are described above. Other embodiments are within the scope of the appended claims. In some cases, the actions or steps recited in the claims may be performed in a different order than in the embodiments and still achieve the desired results. In addition, the processes depicted in the drawings do not necessarily require the specific order shown or a sequential order to achieve the desired results. In some embodiments, multitasking and parallel processing are further possible or may be advantageous.

The terms used in one or more embodiments of this specification are intended for the purpose of describing specific embodiments only and are not intended to limit one or more embodiments of this specification. The singular forms "a", "said" and "the" used in one or more embodiments of this specification and the appended claims are further intended to include the plural forms, unless the context clearly indicates other meaning. It should further be understood that the term "and/or" as used herein refers to and includes any or all possible combinations of one or more associated listed items.

It should be understood that although the terms first, second, third, etc. may be used to describe various pieces of information in one or more embodiments of this specification, these pieces of information should not be limited to these terms. These terms are only used to distinguish the same type of information from each other. For example, without departing from the scope of one or more embodiments of this specification, the first piece of information may further be called the second piece of information, and similarly, the second piece of information may further be called the first piece of information. Depending on the context, the word "if" as used herein can be interpreted as "when" or "in the case of" or "in response to a determination".

In the following description, many specific details are set forth for full understanding the present disclosure, but the present disclosure can further be implemented in other ways different from those described here, and those skilled in the art can make similar promotions without violating the connotation of the present disclosure, therefore the present disclosure is not limited by the specific embodiments disclosed below.

In order to facilitate the understanding of the embodiments of the present disclosure, the specific embodiments of the present disclosure will be further described in detail with the attached drawings.

Figure 5:
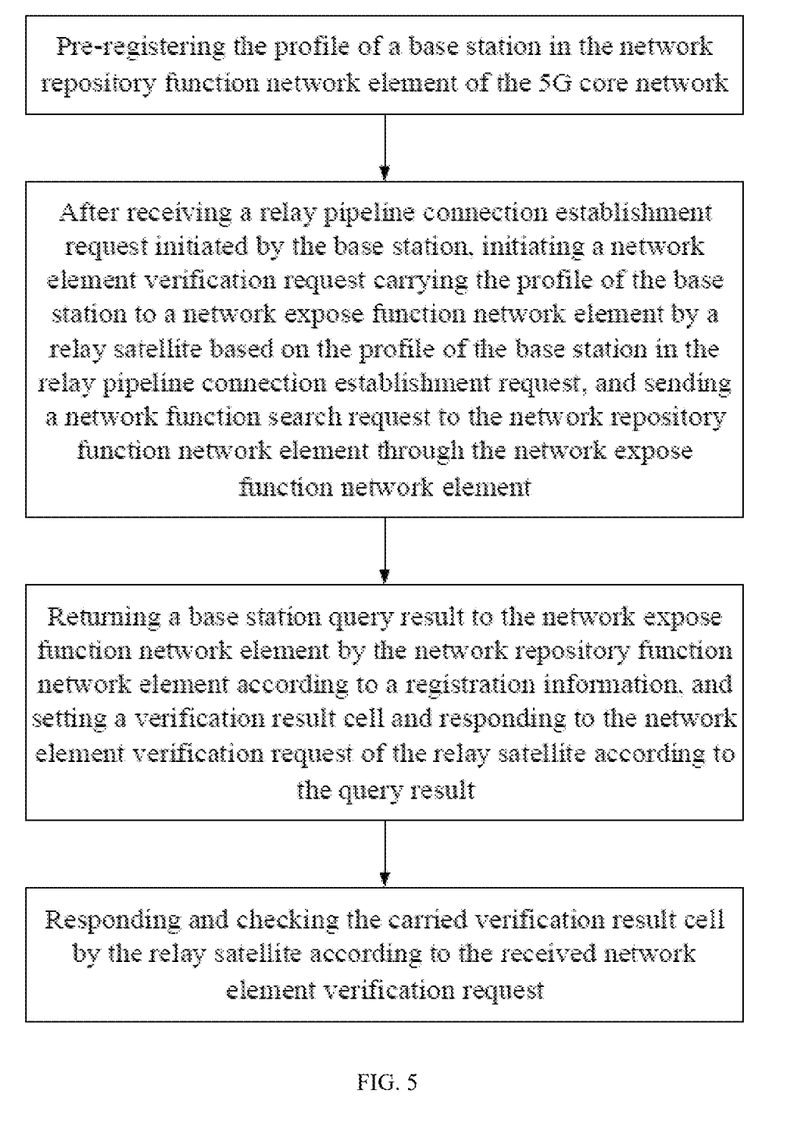
FIG. 5 is a flowchart of a method for improving pipeline safety of a space-terrestrial network architecture provided by an embodiment of the present disclosure.
Figure 6:
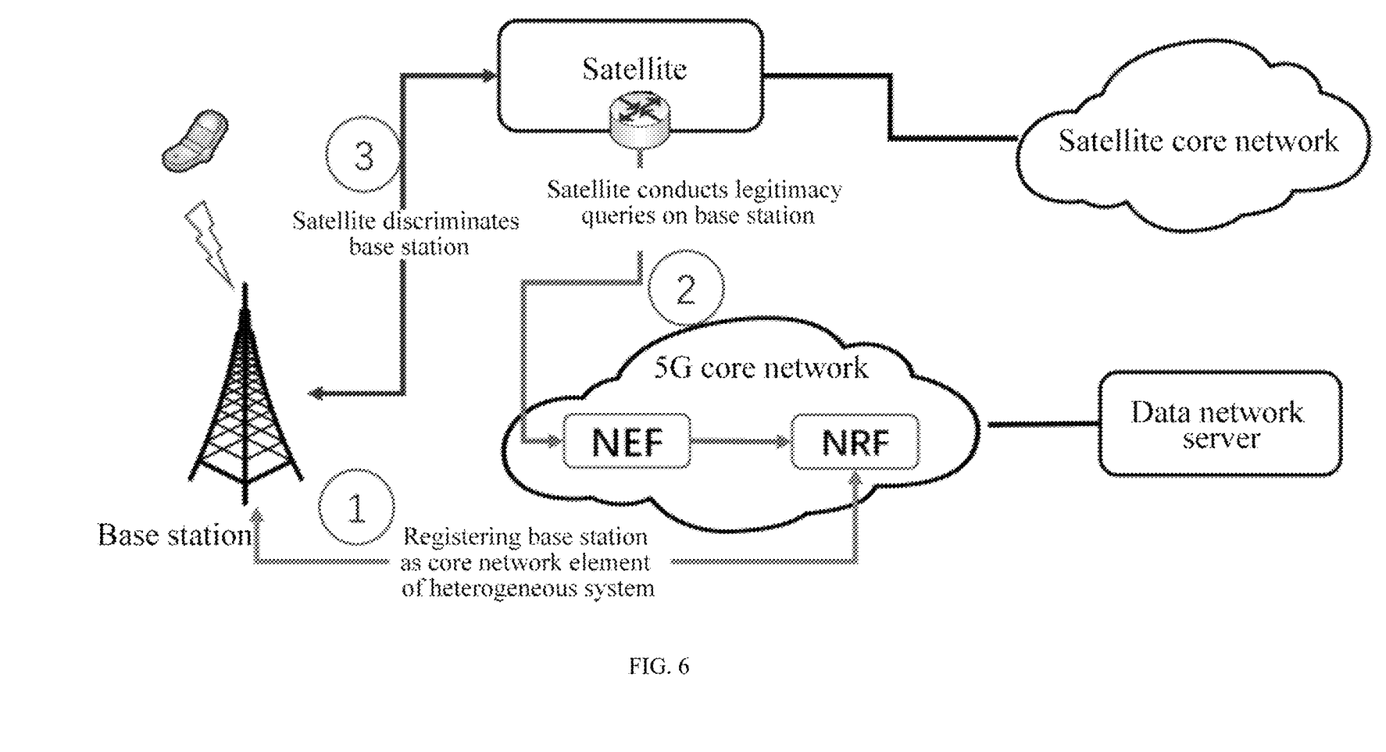
FIG. 6 is an architecture diagram of a relay pipeline safety improvement system provided by an embodiment of the present disclosure.

Embodiment 1: the method based on data sharing architecture between heterogeneous systems networked with 5G and reusing existing network element functions of 5G architecture in the present disclosure, as shown in FIG. 5, includes the following steps:

S1: as shown in FIG. 6, when the legal base station is connected to a 5G core network or a network repository function network element upgrades based on manual configuration, the profile of the base station is pre-registered in the network repository function network element of the 5G core network.

The base station registers the discoverable feature information in the profile of the base station into the NRF of the 5G core network through the NFRegister in the NFManagement Service of the NRF of the 5G core network.

The connection between the legal base station and the 5G core network is as follows: the base station takes itself as a network function node in the satellite-terrestrial integrated architecture, and registers the profile of the base station (gNB) to the network repository function network element of the 5G core network through the network element registration service (NFRegister) in the NRF network element management service (NFManagement Service); this registration process is based on the existing network element registration process of TS 29.510, and carries the base station feature information by adding a new cell structure (RanInfo). The feature information includes geographical location, base station identity (RAN ID, RAN Name), base station tracking area indication (TAI) and base station service time, specifically including a mandatory parameters and optional parameters. The mandatory parameter is a global base station node identity.

The optional parameters are: the name of the base station node, the list of supported tracking areas, the tracking area items supported in the list and the tracking area codes under the tracking area items.

In S1, pre-registering the profile of the base station in the network repository function network element of the 5G core network specifically includes:

The profile of the base station is added into a network function profile carried in a registration request of the network repository function network element, and registered to the network repository function network element. If the registration is successful, a registration success status code with a meaning of registration success and a corresponding network function profile are returned, otherwise a registration success status code with a meaning of registration failure or a relocation status code is returned. In a failure status, the base station needs to re-select an instance of the network repository function network element, and perform a base station registration process again for the selected instance of the network repository function network element.

As shown in FIG. 6, the satellite makes a legality inquiry for the base station:

S2: the satellite's base station pre-configuration table may not be updated in time due to the update interval of the 5G system or the error of the pre-configured information. For example, after receiving a relay pipeline connection establishment request initiated by a certain base station, the satellite sends a network function (base station) search request to the network repository function network element through the network expose function network element of the 5G core network based on the profile of the base station in the relay pipeline connection establishment request. In an embodiment the network element verification request of the 3GPP $5^{th}$ generation communication system (5GS) is sent to the network expose function network element through the 5G system network element verification service, and then the network function search request is sent to the network repository function network element through the network expose function network element. This newly added service is optionally included in the network element NFManagement Service in TS29.510.

A network function search request is sent to the NRF through the existing TS 29.510 NRF network function discovery service, and the request carries the query parameters of the base station profile in the network element verification request received from the satellite. The query parameters of the base station profile include a mandatory parameter and optional parameters, and the mandatory parameter is: global base station node identity, which is used to determine the verification result.

The optional parameters are: the name of the base station node, the list of supported tracking areas, the tracking area items supported in the list and the tracking area codes under the tracking area items, which are used to provide the subsidiary information of the base station. If the optional parameters are not found, the verification result will not be affected.

This part of the content is new. At present, the network element discovery service of the NRF does not support the discovery of base stations. The NEF further does not support receiving information from external network elements of the 5G core network to assist in searching and verifying information in the 5G core network.

S3, after receiving the network function search request, the network repository function network element returns a base station query result to the network expose function network element according to registration information. If there is the registration information corresponding the base station, the network expose function network element sets a verification result in a verification result cell as "REGISTERED", otherwise the network expose function network element sets the verification result as "NOT EXIST", and responds to the network element verification request of the relay satellite.

Returning a base station query result to the network expose function network element according to registration information is specifically as follows: the network repository function network element checks whether the registration information matches the profile of the base station carried in the query request, and returns matching information and setting the request response status code as "query success". If the network function search request cannot be processed, it sets the request response status code as "invalid query" and retransmits the network function search request, or it sets the request response status code as "relocation" and carrying a resource relocation header in the response, representing that the network function search request needs to be retransmitted and sent to a location specified by the resource relocation header.

The network expose function network element returns a response to the network function search request to a corresponding query relay satellite. If the response to the network function search request returned by the network repository function network element cannot be processed, the status code is set as "invalid request"; or the status code is set as "relocation" and the resource relocation header is carried in the response to be sent to the relay satellite.

S4: as shown in FIG. 6, the relay satellite responds according to the received verification request and checks the carried VerificationResult cell. If the verification result cell contains "REGISTERED", it accepts the relay pipeline connection establishment request of the base station and establishes the corresponding relay pipeline; and if the verification result cell carries "NOT EXIST", the relay pipeline connection establishment request of the base station is rejected.

In this step, after receiving the response to the network function search request, if the request response status code is "query success", the relay satellite admits or rejects the base station initiating the relay pipeline connection establishment request according to the carried verification result; if the request response status code is "invalid query", the relay satellite needs to retransmit the network element verification request; if the request response status code is a relocation status code and the resource relocation header is carried in the response, it means that the relay satellite needs to retransmit the network element verification request to the location specified by the resource relocation header; if the relay satellite fails to obtain a valid verification result after trying the network element verification request for a preset number of times, the relay satellite rejects the relay pipeline connection establishment request of the base station.

Figure 7:
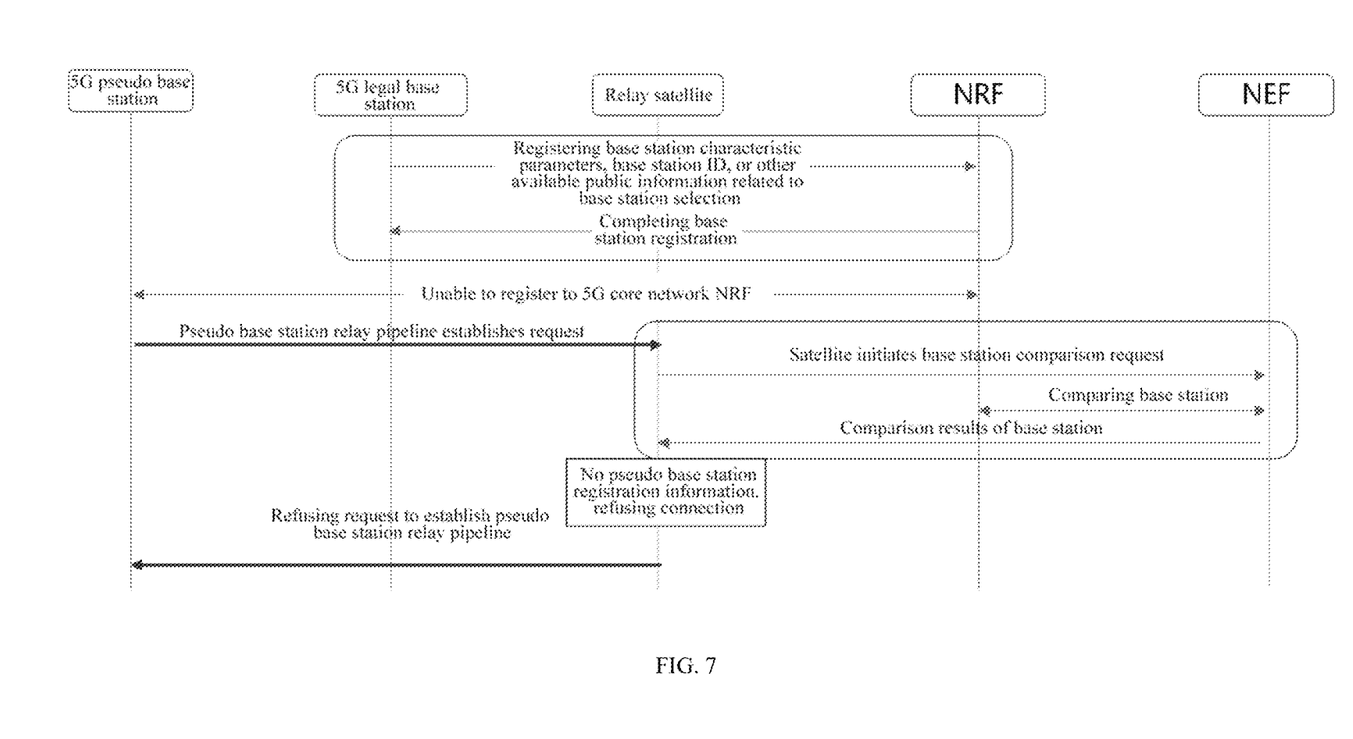
FIG. 7 is a signaling flow of the relay pipeline safety improvement method under the integrated satellite-terrestrial architecture provided by an embodiment of the present disclosure.

Embodiment 2: FIG. 7 shows the signaling flow of a relay pipeline safety improvement method under the integrated satellite-terrestrial architecture proposed by the present disclosure. First, when the 5G terrestrial base station is connected with the 5G core network, it will register the profile of the base station in the NRF of the 5G core network by taking itself as a network function node. This connection can be a direct connection relayed by a default preconfigured satellite, or it can be preconfigured in the NRF by an operator through a network management system (such as a BOSS, Business and operation supporting system).

Figure 8:
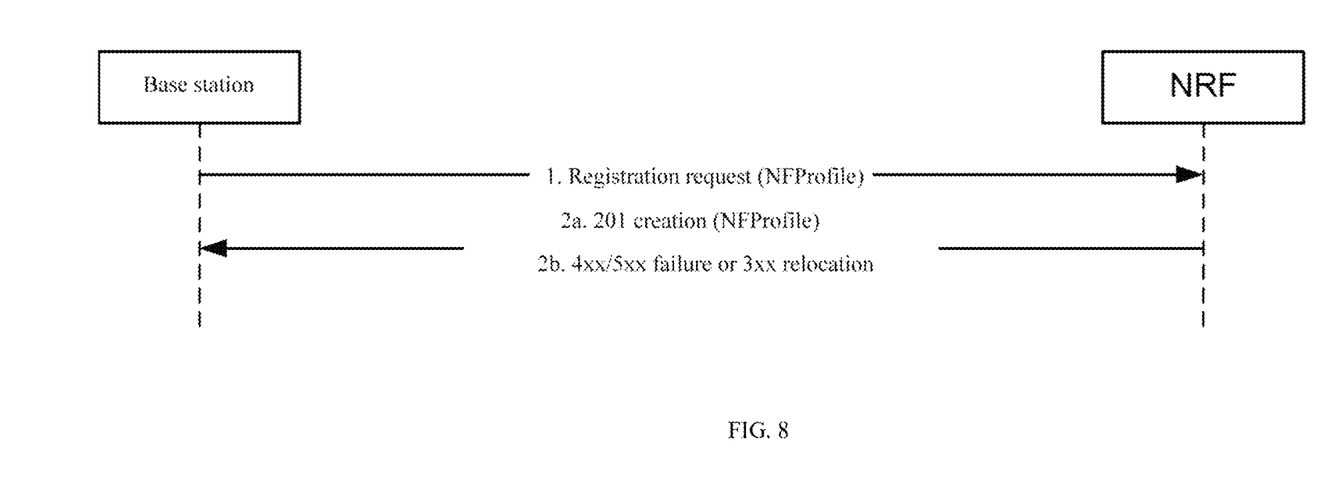
FIG. 8 is a message flowchart of a 5G base station registering base station profile and associated discovery parameters to NRF according to an embodiment of the present disclosure.

As shown in FIG. 8, firstly, as a service consumer, a 5G legal base station sends a registration request with the base station profile to the NRF of the 5G core network for registration through the relay connection established by the default preconfigured satellite. The registration process is based on the TS 29.510 NRF network function registration process, and by adding the newly proposed base station profile (Table 1 and Table 2 give the cell design required for registering the newly added base station profile to the NRF, and this structure is compatible with the existing TS29.510 standard) to the network function profile (NFProfile) carried in the registration request NFRegister Request of the NRF network function management service (NFManagement) and registering to the NRF, a status code "200" or "201" is returned if the registration is successful, and the successfully registered network function profile can be optionally carried according to the status code, as shown in 2a in FIG. 8; otherwise, a status code "4xx"/"5xx" failure or "3xx" relocation is returned, as shown in 2b in FIG. 8. In the failure status, the base station needs to re-select the instance of the NRF and perform the base station registration process for the selected instance of the NRF again.

TABLE 1

Structure of new cell in the network element configuration (NFProfile)

| Attribute name | Data type | Existence | Cardinal number | Description |
| --- | --- | --- | --- | --- |
| RanInfo | RanInfo | O | 0 . . . 1 | Specific data for the RAN (RAN ID RAN name . . . ). |

TABLE 2

Cell structure of newly added base station profile (RanInfo)

| Attribute name | Data type | Existence | Cardinal number | Description |
| --- | --- | --- | --- | --- |
| Global RAN Node ID | TS 38.4139.3.1.1 | M | 1 | |
| RAN Node Name | TS 38.4139.3.1.5 | O | PrintableStringng (SIZE (1 ... 150, ... )) | |
| Supported TA List | | O | 1 | Base station (NG-RAN Next Generation Radio Access Network) Supported tracking areas in the node ( Supported TAs in the NG-KAN node) |
| >Supported TA Item | | O | 1 ... (maxnoof TAGs) | |
| >>TAC | TS 38.4139.3.3.10 | O | | Broadcast TAC Tracking Area Code |

The newly added base station profile cell in Table 1 includes mandatory information (M) and optional information (O) in Table 2.

The mandatory information includes the global base station node identity (Global RAN Node ID), and the optional information includes the name of the base station node (RAN Node Name), the list of supported tracking areas (Supported TA List), the supported tracking area items (Supported TA Item) in the list and the tracking area code (TAC) under the tracking area item.

At this time, it should be noted that although the pseudo base station steals the satellite pre-configured information of the legal base station through certain means, the pseudo base station cannot connect itself to the 5G core network relayed by the satellite and register it in the NRF of the 5G core network. After the relay satellite receives the satellite relay connection establishment request of a new base station (legal or illegal) except those in the configuration table of the legal base station (possibly caused by improper or lagging operation of configuration update), it only needs to match and query the contents of the successfully registered and legal 5G base stations in NRF through the network expose function network element NEF of the 5G core network, as shown in FIG. 9, and the specific steps are as follows:

The relay satellite sends a 5GS network element verification request to the NEF through the new 5G system network element information verification service proposed by the present disclosure. The verification request includes the received configuration query parameters of the base station initiating the relay request, and the parameters include the mandatory and optional parameters in Table 2 (in Table 2, "M" stands for mandatory item and "O" stands for optional items).

After receiving the verification request, the NEF uses the existing TS 29.510 NRF network function discovery service (Nnrf_NFDiscovery in FIG. 9) to search the pre-registered profile of the base station. The NEF sends a network service discovery request with the mandatory and optional parameters in Table 2 to NRF, as shown by 2 in FIG. 9.

Figure 9:
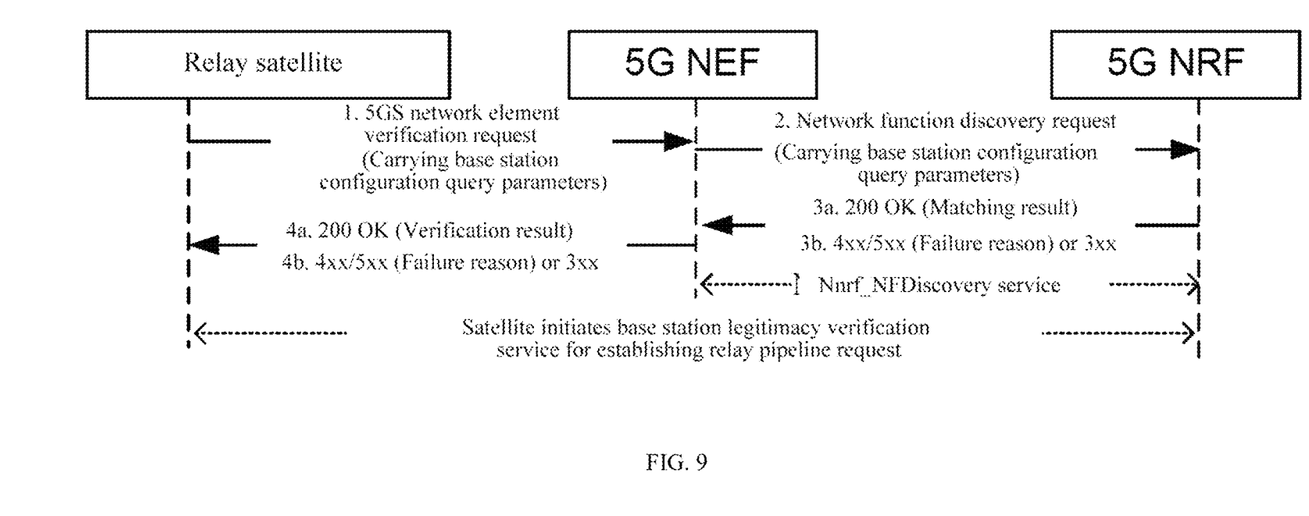
FIG. 9 is a flowchart of a method for verifying the validity of a base station initiating a relay pipeline connection establishment request by a satellite according to an embodiment of the present disclosure.

As shown in 3a of FIG. 9, the NRF receives a network function discovery request from the NEF, checks whether the registration information contains the profile of the base station, returns matching information, sets the request response status code to "200" or "201" and returns the matching result; if the network function discovery request cannot be processed, it sets the status code to "4xx"/"5xx" which means that the query is invalid; if the status codes are "400" and "504", it is necessary to reselect an available NRF instance and retransmit the network function discovery request; or the status code is set to "3xx" with a "relocation" header in the response, which means that the query request needs to be retransmitted and sent to the location specified by the resource relocation header (as shown in 3b of FIG. 9), for example "307" and "308".

The NEF receives the response to the network function discovery request of the base station from the NRF. If the response is handled normally, it sets the status code of the verification request response to "200" or "201", as shown in 4a in FIG. 9, and performs setting and returns the corresponding verification result of the base station according to the network function query result carried in the response to the network function discovery request returned by the NRF.

As shown in Table 3, if there is matching base station information, it is set to "Registered", and if there is no matching base station information, it is set to "Not Exist".

TABLE 3

VerificationResult

| Enumerated item | Description |
| --- | --- |
| "REGISTERED" | The RAN Information is registered in NRF, verification succeed. |
| "NOT EXIST" | The RAN Information is Not registered in NRF, verification failure. |

The NEF returns a response to the network element verification request to the corresponding query relay satellite. If the response of the network function discovery request returned by the NRF cannot be processed, the status code is set to "4xx"/"5xx" which means that the network element verification request is invalid; or the status code is set to "3xx" with a "relocation" header in the response to be sent to the relay satellite, for example "307" and "308".

After receiving the response to the network element verification request, if the status code of the response is "200" or "201", the relay satellite will admit or reject the base station initiating the relay pipeline connection establishment request according to the carried "verification result". If the status code of the received response is set to "4xx"/"5xx", it means that the query is invalid, and the relay satellite needs to reselect the available NEF instance and retransmit the network element verification request when the status codes are "400" and "504"; as shown in 4b in FIG. 9, if the status code of the received response is "3xx" and the relocation header is carried in the response, it means that the relay satellite needs to retransmit the verification request to the location specified by the resource relocation header, for example "307" and "308".

Figure 10:
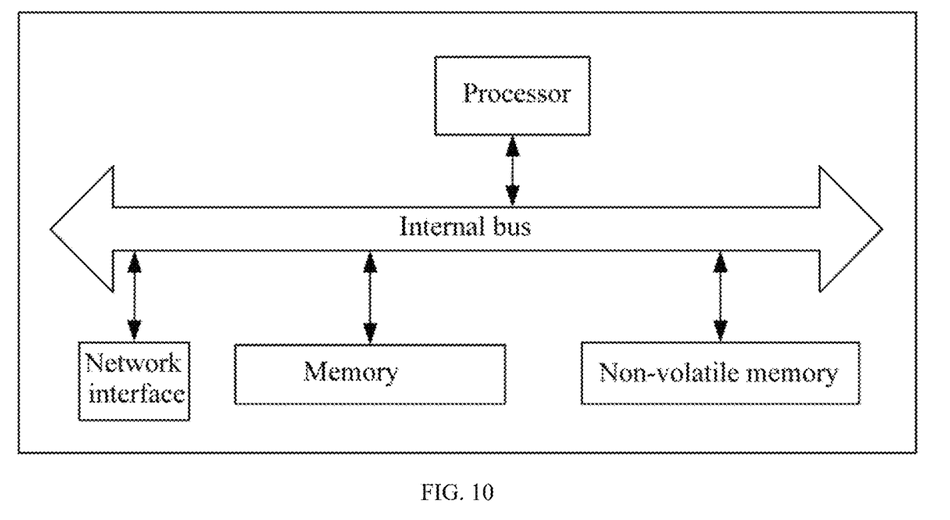
FIG. 10 is a schematic structural diagram of a method and device for improving pipeline safety of a space-terrestrial network architecture provided by an embodiment of the present disclosure.

The embodiment of the device for improving the pipeline safety of a space-terrestrial network architecture can be applied to any device with data processing capability, which can be equipment or devices such as computers. The embodiment of the device can be realized by software, or by hardware or a combination of hardware and software. Taking software implementation as an example, as a logical device, it is formed by reading the corresponding computer program instructions in a non-volatile memory into a memory to be run through the processor of any equipment with data processing capability. From the hardware level, as shown in FIG. 10, it is a hardware structure diagram of any equipment with data processing capability where a pipeline safety improvement device for a space-terrestrial network architecture is located under the space-terrestrial network architecture of the present disclosure. In addition to the processor, memory, network interface and nonvolatile memory shown in FIG. 10, any equipment with data processing capability where the device is located in the embodiment can usually include other hardware according to the actual functions of the equipment with data processing capability, which will not be described here again.

The implementation process of the functions and functions of each unit in the above-mentioned device is detailed in the implementation process of the corresponding steps in the above-mentioned method, and will not be repeated here.

For the device embodiment, since it basically corresponds to the method embodiment, it is only necessary to refer to part of the description of the method embodiment for the relevant points. The device embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solutions of the present disclosure. Those skilled in the art can understand and implement the present disclosure without creative labour.

The embodiment of the present disclosure further provides a computer-readable storage medium, on which a program is stored, and when executed by a processor, the program implements the method for improving pipeline safety of a space-terrestrial network architecture in the above embodiment.

The computer-readable storage medium can be an internal storage unit of any equipment with data processing capability as described in any of the previous embodiments, such as a hard disk or a memory. The computer-readable storage medium can further be an external storage device of any equipment with data processing capability, such as a plug-in hard disk, Smart Media Card (SMC), SD card, Flash Card and the like provided on the device. Further, the computer-readable storage medium may further include both internal storage units and external storage devices of any equipment with data processing capability. The computer-readable storage medium is used for storing the computer program and other programs and data required by any equipment with data processing capability, and may further be used for temporarily storing data that has been output or will be output.

The above is only the preferred embodiment of one or more embodiments of this specification, and it is not used to limit one or more embodiments of this specification. Any modification, equivalent substitution, improvement and the like made within the spirit and principle of one or more embodiments of this specification shall be included in the protection scope of one or more embodiments of this specification.

What is claimed is:

1. A method for improving pipeline safety of a space-terrestrial network architecture, comprising:
   step S1, when a legal base station is connected to a 5G core network or a network repository function network element updates a profile of a network function network element based on manual configuration, pre-registering a profile of a base station in the network repository function network element of the 5G core network;
   step S2, after receiving a relay pipeline connection establishment request initiated by the base station, initiating, by a relay satellite, a network element verification request carrying the profile of the base station to a network expose function network element based on the profile of the base station in the relay pipeline connection establishment request, and sending a network function search request to the network repository function network element through the network expose function network element;
   step S3, after receiving the network function search request, returning, by the network repository function network element, a base station query result to the network expose function network element according to a registration information; and when the registration information of the base station exists, setting a verification result in a verification result cell as "REGISTERED" by the network expose function network element; and otherwise, setting the verification result as "NOT EXIST", and responding to the network element verification request of the relay satellite; and
   step S4, responding and checking, by the relay satellite, the carried verification result cell according to the received network element verification request,
   when the verification result cell carries the verification result of "REGISTERED", accepting the relay pipeline connection establishment request of the base station; and
   when the verification result cell carries the verification result of "NOT EXIST", rejecting the relay pipeline connection establishment request of the base station.

2. The method for improving pipeline safety of the space-terrestrial network architecture according to claim 1, wherein a connection between the legal base station and the 5G core network in the step S1 comprises:
   taking the legal base station and the 5G core network as network function nodes, and registering the profile of the base station to the network repository function network element of the 5G core network through a registration service of the network repository function network element of the 5G core network,
   wherein the profile of the base station in a registration process is carried through a newly added cell structure; and
   wherein the profile of the base station comprises a mandatory parameter and optional parameters, and the mandatory parameter comprises a global base station node identity; and the optional parameters comprise a name of a base station node, a list of supported tracking areas and tracking area items supported in the list, as well as tracking area codes under the tracking area items.

3. The method for improving pipeline safety of the space-terrestrial network architecture according to claim 2, wherein in the step S1, said pre-registering the profile of the base station in the network repository function network element of the 5G core network further comprises:
  adding the profile of the base station into a network function profile carried in a registration request of the network repository function network element, and registering to the network repository function network element; when a registration is successful, returning a registration success status code and a corresponding network function profile, otherwise returning a registration failure status code or a relocation status code; and in a failure status, re-selecting an instance of the network repository function network element by the base station, and performing a base station registration process again for the selected instance of the network repository function network element.

4. The method for improving pipeline safety of the space-terrestrial network architecture according to claim 2, wherein the network function search request sent by the network expose function network element carries query parameters of the profile of the base station, and the network repository function network element, after receiving the network function search request, continues to use an existing network function discovery service to search the profile pre-registered for the base station.

5. The method for improving pipeline safety of the space-terrestrial network architecture according to claim 4, wherein the query parameters of the profile of the base station are the mandatory parameter and the optional parameters consistent with the profile of the base station, and wherein the mandatory parameter is configured to determine the verification result, and the optional parameters are configured to provide a subsidiary information of the base station.

6. The method for improving pipeline safety of the space-terrestrial network architecture according to claim 1, wherein said after receiving the network function search request, returning the base station query result to the network expose function network element by the network repository function network element according to the registration information further comprises:
  checking whether the registration information matches the profile of the base station carried in the query request by the network repository function network element, and returning matching information and setting a request response status code as "success query"; and
  when the network function search request is not capable of being processed, setting the request response status code as "invalid query" and retransmitting the network function search request, or setting the request response status code as "relocation" and carrying a resource relocation header in a response, representative of that the search request needs to be retransmitted and sent to a location specified by the resource relocation header.

7. The method for improving pipeline safety of the space-terrestrial network architecture according to claim 6, wherein in the step S4, after receiving the response to the network function search request, when the request response status code is "query success", the relay satellite admits or rejects the base station initiating the relay pipeline connection establishment request according to the carried verification result; when the request response status code is "invalid query", the relay satellite needs to retransmit the network element verification request; when the request response status code is a relocation status code and the resource relocation header is carried in the response, the relay satellite needs to retransmit the network element verification request to the location specified by the resource relocation header; and when the relay satellite fails to obtain a valid verification result after trying the network element verification request for a preset number of times, the relay satellite rejects the relay pipeline connection establishment request of the base station.

8. The method for improving pipeline safety of the space-terrestrial network architecture according to claim 1, further comprising: returning a response to the network function search request to a corresponding query relay satellite by the network expose function network element; when the response to the network function search request returned by the network repository function network element is not capable of being processed, setting a request response status code as "invalid request"; or setting the request response status code as "relocation" and carrying the resource relocation header to send to the relay satellite in the response.

9. A device for improving pipeline safety of a space-terrestrial network architecture, comprising a memory on which executable codes are stored, and one or more processors, wherein the executable codes, when executed by the one or more processors, is configured to implement the steps of the method for improving pipeline safety of the space-terrestrial network architecture according to claim 1.

10. A non-transitory computer-readable storage medium on which a program is stored, wherein the program, when executed by a processor, is configured to implement the steps of the method for improving pipeline safety of the space-terrestrial network architecture according to claim 1.

* * * * *